United States Patent [19]

Landsman

[11] Patent Number: 4,764,815
[45] Date of Patent: Aug. 16, 1988

[54] ARRAY SCANNING SYSTEM WITH MOVABLE PLATEN

[75] Inventor: Robert M. Landsman, Huntington Station, N.Y.

[73] Assignee: Powers Chemco, Glen Cove, N.Y.

[21] Appl. No.: 748,320

[22] Filed: Jun. 24, 1985

[51] Int. Cl.$^4$ .................... H04N 1/12; H04N 1/04; H04N 1/10
[52] U.S. Cl. .................................... 358/293; 358/285
[58] Field of Search ............... 358/293, 285, 294, 296

[56] References Cited

U.S. PATENT DOCUMENTS

| | | | |
|---|---|---|---|
| 3,155,383 | 11/1964 | Whitmore | 269/58 |
| 3,662,103 | 5/1972 | Willmer et al. | 358/285 |
| 3,867,675 | 2/1975 | Kitz et al. | 358/285 |
| 3,886,371 | 5/1975 | Lloyd | 358/285 |
| 4,131,916 | 12/1978 | Landsman | 358/285 |
| 4,245,259 | 1/1981 | Pick | 358/285 |
| 4,319,283 | 3/1982 | Ozawa et al. | 358/293 |
| 4,348,697 | 9/1982 | Takahashi et al. | 358/286 |
| 4,455,910 | 6/1984 | Kraft et al. | 83/874 |
| 4,471,375 | 9/1984 | Oritsuki et al. | 358/294 |
| 4,476,496 | 10/1984 | Thaler | 358/286 |
| 4,485,409 | 11/1984 | Schumacher | 358/294 |
| 4,495,871 | 1/1985 | Nagata et al. | 108/20 |
| 4,686,581 | 8/1987 | Spehrley, Jr. et al. | 358/293 |

FOREIGN PATENT DOCUMENTS

| | | | |
|---|---|---|---|
| 2510333 | 1/1983 | France | 358/285 |
| 57-112181 | 7/1982 | Japan | 358/293 |

Primary Examiner—James J. Groody
Assistant Examiner—Randall S. Svihla
Attorney, Agent, or Firm—Morgan & Finnegan

[57] ABSTRACT

A scanning apparatus for the array scanning of information upon a record medium to simultaneously develop a multiplicity of information lines. Scanning is carried out by a reciprocating shuttle traversing the width of the scanning area. The record medium to be scanned is mounted on a platen that undergoes periodic longitudinal advancement through a distance corresponding to the width of the band traced by the scanning array. The platen advances when the shuttle is undergoing its reversal. Precise incrementing of the platen is achieved by the positioning of a reference element during the active scanning segment of the shuttle and then locking the reference element in position. The platen is then quickly advanced into contact with the reference element during the short reversal of time of the shuttle. Springs are used to help reverse the direction of travel of the shuttle at each end of its reciprocating scan. The springs are supported independently from the scanning apparatus in order to isolate the scanning apparatus from shocks and vibrations caused by the reversal in the direction of travel of the shuttle.

37 Claims, 5 Drawing Sheets

ARRAY SCANNING SYSTEM WITH MOVABLE PLATEN

FIELD OF THE INVENTION

This invention relates to a scanning system of high resolution and accuracy useful in preparing or reproducing images on or from films, printing plates and the like for such industries as newspapers, publishing, and engineering. In particular, the invention relates to a scanning system adapted to use array imaging means whereby several information lines may be scanned or reproduced simultaneously during each traverse of a scanning head.

BACKGROUND OF THE INVENTION

Scanners for facsimile reproduction optically scan an original image to develop electrical signals representative of that image. These signals then can be processed, stored, combined with computer-generated data, transmitted to other locations and/or utilized in reproduction apparatus to reconstitute the image originally scanned.

The prior art has followed several approaches to facsimile reproduction, each approach depending upon various specific uses and objectives sought to be achieved. One prior art example is shown is U.S. Pat. No. 4,245,259 to Pick. There, an optical character recognition device constitutes part of a photocomposition system wherein a scanner is mounted for reciprocal movement over the image containing surface. This scanner reads the information on the surface during each traverse of the scanner. An apparently conventional roller drive controlled by a stepping motor advances the sheet longitudinally under the traversing shuttle mechanism. The reversal of this scanning shuttle, or scanning head, at each end of its movement is facilitated by springs mounted at the ends of the shuttle guide rod. Springs help to slow the scanner and to reverse its direction.

Another prior art device is described in Thaler U.S. Pat. No. 4,476,496. This is a facsimile device providing for periodic movement of the original sheet during the turnaround of the scanner at each end of its scanning traverse. Like the Pick apparatus, the Thaler machine incorporates spring stops at the end of the shuttle guides for assisting turnaround of the shuttle. Another similar scanner is described in U.S. Pat. No. 4,348,697 to Takahashi et al., which is capable of developing signals representing information for more than one scan line during each traverse of the carriage.

The technology represented by the foregoing patents has been used primarily in roster machines intended generally to minimize the cost of the machine. Unfortunately, these cost considerations ordinarily result in a sacrifice of reproduction accuracy or reproduction versatility (e.g., a limitation in the size of the area capable of being scanned with precision).

Scanner technology also has been used in the newspaper industry to prepare negatives to form printing plates from optically scanned sheets such as the "paste up" of a newspaper page. Of course, newspapers often require a higher degree of resolution with larger formats and faster throughputs than facsimile transmission machines for inter-office use. Machines capable of achieving higher resolution typically are either too slow or labor intensive for most newspapers. Moreover, many newspapers now utilize color formats on some of their pages. Such color formats require scanners which provide greater resolution and position of accuracy than those intended primarily for black and white reproduction.

One approach for achieving accuracy is to increase the size and mass of the components, thereby achieving better immunity from vibration and better stability. However, the moving parts in these high mass scanners inherently have been burdened with high mechanical accelerations and forces. The momentum attributable to these large rapidly moving components in prior art scanners can result in internally developed vibrations with a resultant decrease in accuracy.

The present invention preferably uses what is known as array scanning technology wherein, for each sweep of the scanning shuttle mechanism, several lines of information are developed. Such array technology is an outgrowth of photo-lithographic techniques developed by the semiconductor industry. Array technology has appeared in a number of recent scanners and printers. However, a review of this technology by experts in the field indicates that the performance of the first generation array printers and typesetters has not yielded the expected returns. The poor results have been attributed to the low cost, light-weight construction employed to reduce mechanical acceleration and forces inherent in more massive systems. This light-weight construction is prone to thermal and mechanical distortions which require frequent adjustment to correct for loss of precision.

In many prior single line, non array scanners operating at higher speeds, the sheet to be scanned moves continuously during the scanning operation. Alignment of the scanned data is thus skewed relative to the direction of movement of the sheet. The degree of skew is dependent upon the rate of movement of the original sheet and the speed or velocity of the scan line. This particular method of scanning has imposed limitations on both the speed and accuracy available. One such scanning system is shown in my earlier U.S. Pat. No. 4,131,916 in which the sheet to be scanned is carried on the inside of the stationary drum or curved surface. A scanning head mounted for movement at the axis of the curved surface is axially and rotationally movable on air bearing supports and is powered by suitable pneumatic drives. Such drum scanners are more prone to dimensional variations as a function of environmental changes, and have sacrificed productivity in order to achieve scanning efficiency and improved mechanical performance of the spinning laser.

Other known types of scanners, including those employing flat-bed imaging techniques, typically have relied upon mechanical or electrical motors to advance the media being scanned. The use of conventional electrical and electro-mechanical components to position the scanner and/or flat bed generally have not provided the desired degree of accuracy and speed for intermittent motion of a platen and high scanning rates.

A principal object of the present invention accordingly is to provide a scanner or recorder having the requisite geometric accuracy, resolution, large format and speed for present-day photocomposition, and at a cost which will make it affordable for small newspapers, engineering and other businesses.

Other objects of the invention are to reduce the mechanical forces and accelerations contributing to inaccuracies of known scanning systems, and to provide a scanner which achieves rapid and accurate intermittent motion of a flatbed platen carrying the media to be scanned or imaged.

SUMMARY OF THE INVENTION

The present invention encompasses facsimile scanning systems capable of operating either as a scanner for developing electrical signals representing the image which has been scanned, or as a recorder which can reproduce such an image by retracing a similar scanning pattern with a beam (e.g., a coherent laser light beam) modulated by such electrical signals to expose a photographic plate.

The scanning apparatus includes a scanning head, or shuttle, that moves transversely across and spaced above the surface to be scanned. The scanning shuttle reciprocates between the opposite edges of the area to be scanned. Information to be written upon or read from the scanned area is developed as a function of modulation of the scanning beam. Preferably, the scanning beam operates as an array whereby many lines of information are read or recorded during each traverse of the scanning carriage. Such array operation may be achieved with multiple active elements located on the scanning head, or by simultaneously executing a higher frequency sub-scan with, for example, a modulated laser beam, periodically deflected in a direction transverse to the direction of of the main scanning motion.

In preferred embodiments of the invention, reversal of the scanning head at the end of each traverse is achieved by spring means, located at the side edges of the scanned area. Such spring means, preferably in the form of an air spring, decelerate the scanning head and assist in projecting it in the opposite direction by storing up the energy absorbed during deceleration and subsequently releasing that energy to the scanning head. In accordance with the invention, the spring means, which must absorb the sudden shocks exerted by the scanning head at the ends of each traverse, are supported independently of the scanner and the imaging surface being scanned. As a result, vibrations or shocks accompanying the rapid reversal of the scanner are not transmitted to the other operative parts of the apparatus and, consequently, have little effect upon system accuracy.

The scanning head, or shuttle, accomplishes the transverse scan over a narrow strip of the total scanning area. To scan the complete area, it is necessary for the area to advance incrementally after each transverse scan of the shuttle. In accordance with the invention, the medium being scanned is carried by a platen which is incrementally advanced longitudinally in a manner which permits high degree of accuracy to be obtained. This accuracy is essential to high quality imaging, which requires that the individual transverse scan paths be substantially contiguous. In other words, the scanning pattern should not contain overlaps or gaps of the transverse scans.

The overall speed of the apparatus is dependent in part on the ability to rapidly carry out this incremental advancement of the material being scanned and, thus, of the platen. As noted earlier, prior art scanners often sacrificed accuracy to achieve the desired speed, or vice versa. The present invention operates at both high speed and required accuracy by employing a movable reference element which accurately positions itself at a prescribed incremental distance ahead of the platen. The platen and the reference element are mounted in proximity to one another and are independently movable for alternate advancement in the longitudinal direction. More particularly, the reference element is operative to move the required incremental amount (corresponding to the width of one transverse scan) during the time that the platen is stationary, i.e., during the active segment of a transverse scan. The elapsed time for this scan is relatively long, and thus the incremental advancement of the reference element can be carried out readily with the required precision.

The reference element serves as a stop against which the primary platen is advanced. This stop provides a positive mechanical control on the limit of advancement of the platen. As a result, there is no need for the platen advancing mechanism to provide positional accuracy, this being obtained by the reference element. For this reason, the platen can be advanced rapidly against the stop of the reference element during the short turnaround time of the shuttle, which occurs during an inactive segment of the scan. Thereafter, the platen once more is locked in place for the duration of the following scan. During this time frame, the reference element once again increments precisely by an amount equal to the width of a single scan path.

Movement of the platen and the reference element can be controlled by any of several means, e.g., linear induction motors or pneumatic or hydraulic actuators. Preferably, the platen and the reference element are supported on air bearing means to which both positive and negative pressure can be directed at appropriate times in the platen advancing cycle. In this way, positive pressure establishes an essentially fictionless support for moving the platen and the reference element from one position to the next, whereas negative pressure causes the air bearing to frictionally engage a guide or support to lock the components in place. For a better understanding of the invention and the specific advantages and features thereof, reference should be made to the following detailed description and to the drawings.

DETAILED DESCRIPTION OF THE PREFERRED EMBODIMENT

Figure 1:
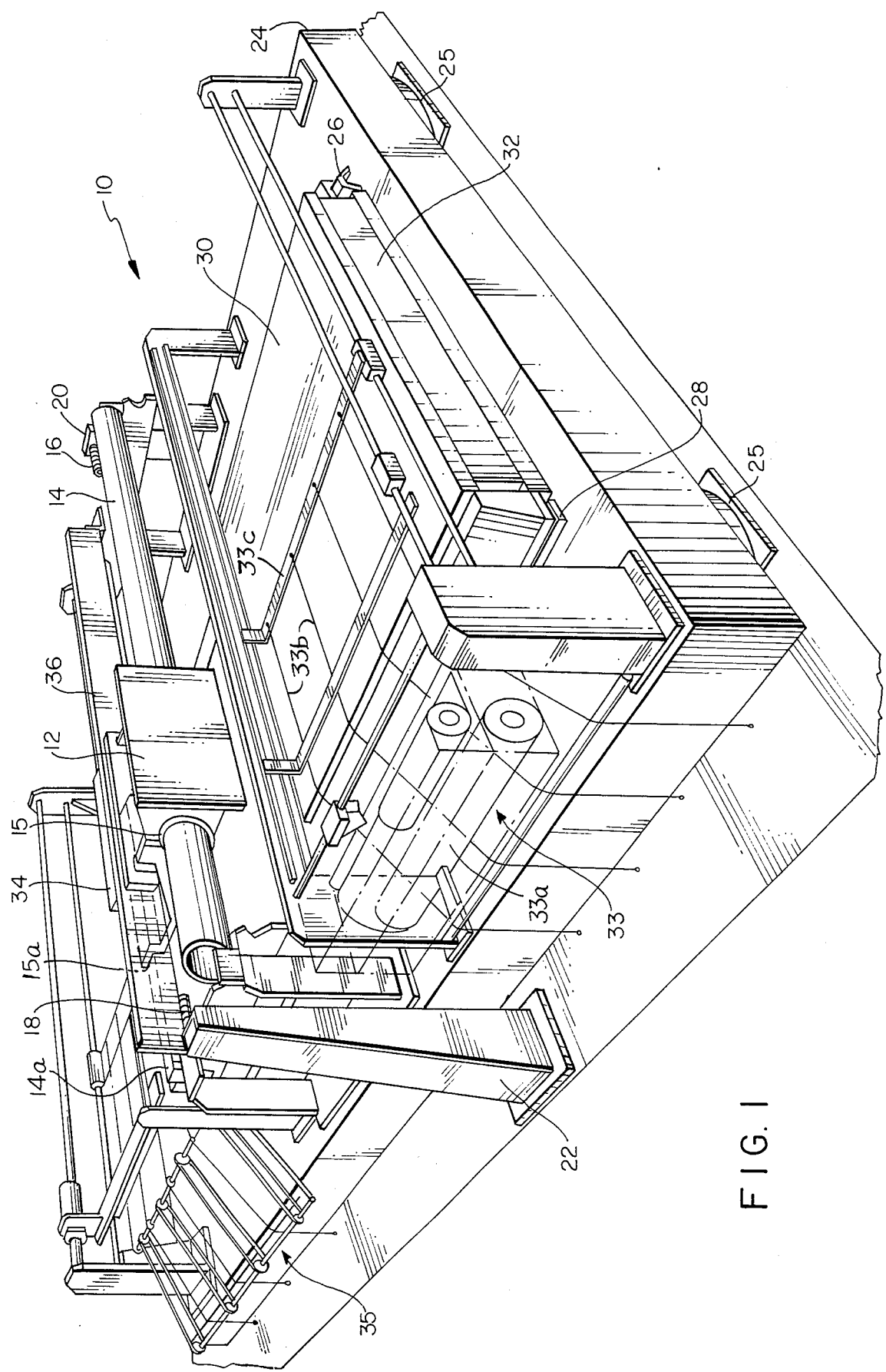
FIG. 1 is a pictorial perspective view of a complete scanning system incorporating features which are the subject of this invention.

Referring to FIG. 1, a complete scanning system embodying the several features of the invention is indicated generally by the numeral 10. The system 10 includes a scanning head, or shuttle 12, slidably supported by a primary guide shaft 14 of round cross-section, and by a parallel guide bar 14a. These shuttle guides extend transversely across the top of the machine. It should be remarked that guides may take other configurations. For example, the function of the two guides, 14, 14a may be combined into a single guide of rectangular or diamond cross-section.

Air bearings, such as bearings 15, 15a provide an exceptionally low friction interface between the shuttle and its guides 14, 14a. The shuttle 12 carries at least a portion of the scanning beam optics. As mentioned earlier, a laser light source is preferred, and light from this source is modulated with the information to be recorded or read, as the case may be.

Spring means, represented by simple springs 16, 18 in FIG. 1, are provided to decelerate and reverse the shuttle 12 at the end of its movement along guide shafts 14, 14a. Spring means 16, 18 are mounted to heavy vertical supports 20, 22 which are secured to a base 19 which rests on the floor (not shown) and are physically independent of the remainder of the machine, thereby to substantially isolate the bed 24 of the apparatus from shocks and vibrations caused by the cyclical reversals of the shuttle.

The main bed 24 has significant mass and generally supports the operative elements of the system. Mounted to the top surface of the bed 24 is a pair of longitudinally extending guide rails 26, 28. These rails define the direction of movement of the primary platen 30 and are aligned generally perpendicular to the transversely situated guide shafts 14, 14a. Bed 24 is equipped with a plurality of leveling adjusters 25 which respond to suitable level sensors and are hydraulically or pneumatically operated automatically.

The primary platen 30 and a reference element, in the form of a lower platen 32, are slidably supported on guide rails 26, 28 for controlled step-wise movement underneath the scanning shuttle. The medium to be scanned, such as an original newspaper page paste-up sheet (in the scanning mode) or a film or photosensitive plate (in the recording mode) is secured to the top surface of the flatbed primary platen 30. This medium is thus incrementally advanced with the platen 30 underneath the scanning shuttle.

The scanning apparatus 10 further includes a loader 33 for automatically loading sheets of material to be scanned onto to the primary platen 30. The loading mechanism may implement any of a number of known approaches for automatically placing sheet material upon the flat upper surface of the platen. For the purpose of illustration only, FIG. 1 shows an arrangement whereby the sheet material is drawn from rolls 33a over a series of spaced wires 33b attached to a sliding bar 33c. In operation, the sheet material is drawn over the top of the wires from the rolls 33a by movement of the sliding bar 33c from left to right. The empty platen 30 may then be moved underneath the sheet and the wire supports withdrawn so that the sheet material is free to fall upon the platen. As understood to those skilled in the art, it is customary to provide registration means on the platen so as to accurately locate the media to be scanned within the scanning area of the platen.

In a similar manner, the scanning apparatus includes an unloader 35 at the discharge end for removing scanned media from the platen surface. The unloader mechanism may include a similar retractable wire support, and pickup means, such as a vacuum head, may be used to lift the scanned material up from the bed surface.

Figure 2:
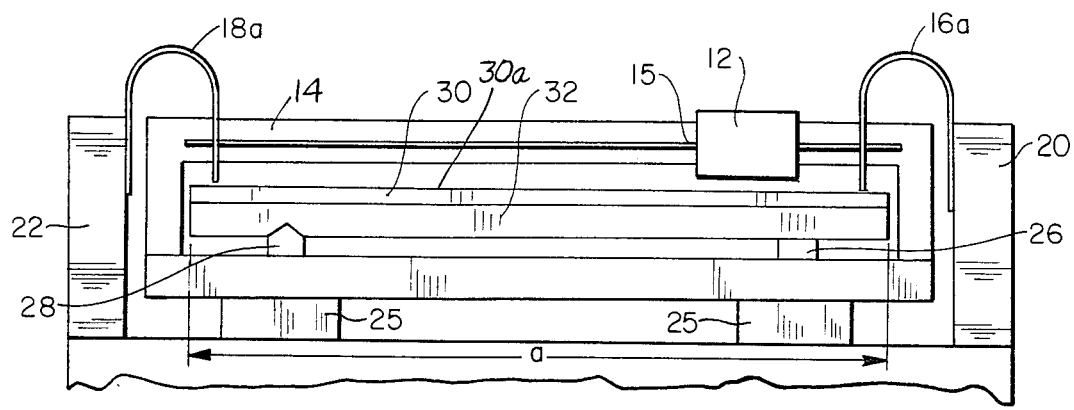
FIG. 2 is a simplified end view showing the relationship among the platen and scanning mechanism components of the invention.

The relationship among the components of the transverse scanner can be seen more clearly in FIG. 2. For simplicity, the various components are shown diagramatically. As already described, scanning head, or shuttle 12, is slidably mounted for reciprocating transverse scanning motion between the left and right edges of the scanning area. This shuttle 12 rides along the guide rods 14, 14a on an air bearing interface. The shuttle guides 14, 14a are, of course horizontal and therefore parallel to the top surface 30a of the flat-bed platen. The scanning optics (not shown in FIG. 2) implements so called array technology wherein, for each transverse scan of the shuttle, a multitude of individual lines of video or text information is derived.

The present invention is capable of extremely good accuracy, in that platen 30 is controlled to advance a precise amount during each traverse of the scanning head 12. Platen 30 is held stationary as the shuttle 12 traverses from one edge of the scanning area to the opposite edge. The active scan segment of this traverse is during the time that shuttle 12 is between the longitudinal edges of the scanning area containing the information to be read or recorded. During the inactive segment of the traverse, the shuttle passes beyond the edge of the active scanning area, encounters the spring means 16 or 18, is rapidly decelerated, reversed in direction and then accelerated in the other direction to start the next transverse scan, this time in the opposite transverse direction. Thus, the active segment of the scan occurs when the shuttle is moving from left to right as well as when it is moving from right to left. During the inactive segment of the scan, the platen 30 is advanced a precise distance so that the scanned strips of the scanning area are contiguous.

The scanning mechanism of the present invention is capable of developing hundreds of individual information lines during each traverse of the scanning shuttle. If each scanned strip is assumed to have a width of, for example, 0.256 inches, and each line of information is 0.001 wide, then 0.256 active lines of information are developed during each shuttle traverse. In the present invention the array scanning is effected by having the scanning beam execute a high frequency sub-scan. Thus, as the shuttle moves transversely across the scanning area, the scanning beam is cyclically deflected at a high rate in the longitudinal direction (i.e., parallel to the direction of movement of the platen). As it executes this subscan, the beam is turned "on" or "off" 256 times so as to establish 256 pixel elements over the width of each scan strip. Thus, each pixel element measures approximately 0.001 inches in diameter. Consequently, each traversal of the scanning shuttle 12 will cover a band of information approximately 0.25 inches wide (as measured in the direction of motion of the platen). The platen advance that same amount at the completion of each scan traversal, i.e., 0.256 inches each time the shuttle reverses direction.

The capacity of the shuttle 12 to accurately read or write data is dependent, at least in part, on the maintenance of a constant shuttle speed during the active segment of the scan. This constant speed is obtained with a linear induction motor 34 (FIG. 1) mounted to shuttle 12, as shown. Linear induction motor 34 operates in conjuction with the fixed armature bridge 36 (FIG. 1) which extends parallel to and between shuttle guides 14, 14a. As explained in more detail below, the linear induction motor 34 is controlled by a signal from a laser doppler velocimeter or other suitable encoder that accurately measures instantaneous speed of the shuttle and modifies, if necessary, the motor excitation signal to compensate for any undesired speed changes. It will be apparent that linear induction motor 34 need not, and does not, supply the majority of the energy required to maintain the shuttle in motion. More than 90% of the energy is supplied by spring means 16–18 which absorb the kinetic energy or inertia of the shuttle and release that same energy to project the shuttle in the reverse direction. The linear induction motor 34 thus needs only to supply the frictional and spring losses.

The dimension of the active scan of the shuttle 12 varies, of course, according to the page size, or plate size, to which the system is adapted. For a typical large page newspaper which prints an advertisement extending over two pages e.g., USA Today, the distance travelled by the shuttle during its scan may be approximately 40 inches (dimension a in FIG. 2). This distance includes about 36 inches of active scan and 4 inches of inactive scan, or 10%, for deceleration, reversal and acceleration in the opposite direction of the shuttle. (In FIG. 2, the spring means are illustratively shown as cantilever type springs 16a and 18a.). Shuttle 12 may be operated at a constant linear velocity of approximately 40 inches per second. Consequently, a 36 inch wide sheet can be scanned in approximately 0.9 seconds. Deceleration and reversal are alloted approximately 0.1 seconds.

Experiments have demonstrated the spring means 16, 18 can return approximately 98% of the kinetic energy of the shuttle during the turnaround operation. Under that assumption, the linear induction motor 34 needs to supply only about 2% of the energy needed by comparable systems not utilizing spring assisted turnaround. These experiments also indicate that a scanning head weighing approximately 20 pounds can be turned around in a space of approximately 1.27 inches and within approximately 0.1 seconds. This performance can be obtained with a spring whose spring constant is approximately 50 pounds per inch. In the present invention the motor force is adjusted in response to a shuttle velocity measurement just after the shuttle has rebounded from the spring means. This adjustment is made at each end of the traverse during the time that the shuttle engages the spring.

Figure 3:
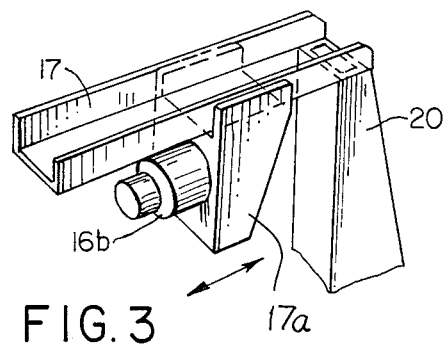
FIG. 3 is a simplified perspective view of one form of spring means used in the shuttle mechanism shown in FIG. 2.

FIG. 3 shows one of the vertical supports 20 to which is mounted a horizontal channel 17 carrying an adjustable bracket 17a which is securing an air spring 16b. This type of spring is connected to a source of air pressure and includes a movable internal piston connected to a plunger contacted by the shuttle 12. The piston of the air spring has a lower mass than a traditional spring, and the constant force that an air spring imparts to the shuttle reduces the stroke. The air spring force is readily adjusted with an air pressure regulator. Moreover, since it is possible to feed each of the air springs with the same regulator, a better match of rebound time is possible.

Figure 4:
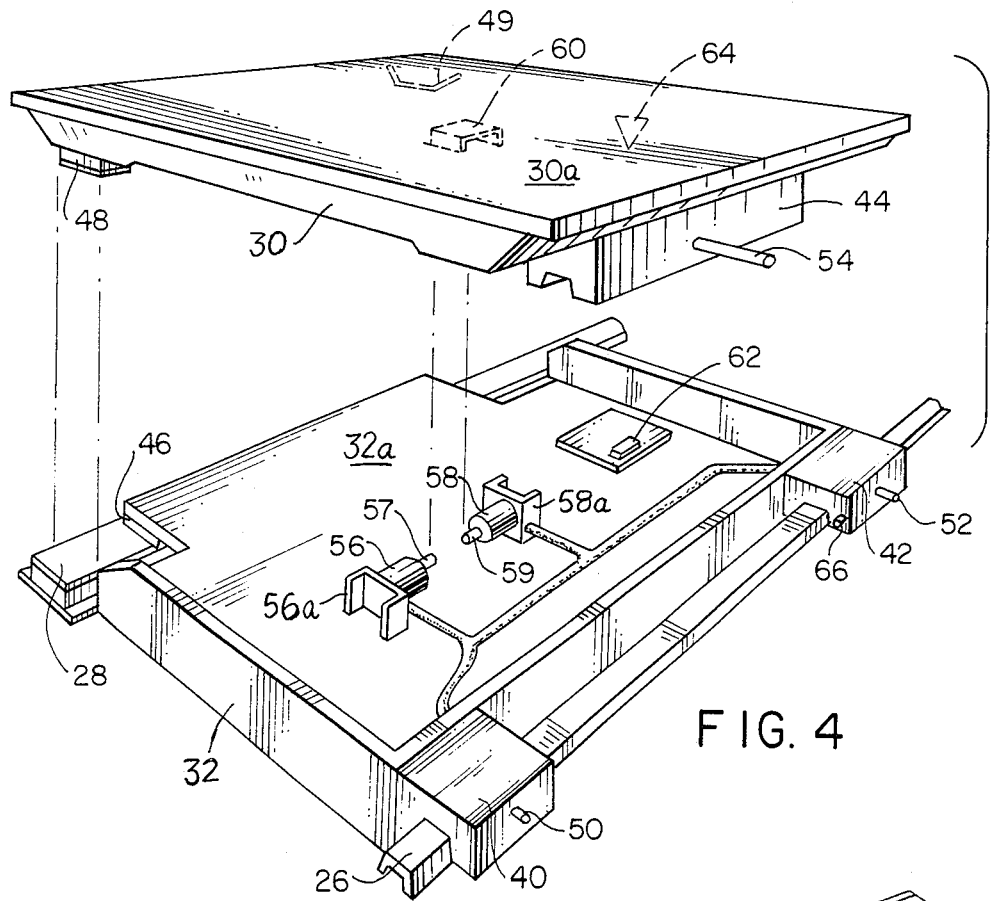
FIG. 4 is an exploded perspective view of the movable platen and reference element of the invention, together with the associated activating components.

As illustrated most clearly in FIG. 4, primary platen 30 and reference platen 32 both move along longitudinal guide rails 26, 28. Rails 26 and 28 define a common plane parallel to the transverse shuttle guide shafts 14, 14a and are orthogonal to the path of the shuttle.

Reference platen 32 includes air bearings 40 and 42 which ride on rail 26. Primary platen 30 includes air bearing housing 44 riding on rail 26 at a location intermediate bearings 40 and 42 of reference platen 32. Similar air bearings are used at the opposite sides of the platens, the reference platen 32 having air bearing 46 acting on rail 28 and primary platen 30 including air bearings 48, 49 mounted on its corners and straddling air bearing 46. The air bearings 40, 42, 44, 46, 48, 49 are dimensioned to establish a low friction interface for sliding movement of the primary and reference platens over the top surfaces of rails 26, 28.

An extremely low-friction interface between the platen and rails results from a precisely controlled flow of compressed air through the air bearings. When a source of pressurized air is connected to ports 50, 52 and 54, on bearings 40, 42 and 44, for example, the air bearing rises from the rails. Conversely, when a source of vacuum is applied to ports 50, 52 or 54, the air bearings 40, 42 or 44 become frictionally locked against the rails with high pneumatic forces. Thus the air bearings provide dual functions. They act as low friction interfaces to provide essentially frictionless movement of the platens 30, 32, and they operate as brakes to firmly lock either platen at any given location on the rails.

The pneumatic control of the air bearings is timed synchronously with shuttle 12 such that the primary platen is locked in place while the reference platen is being precisely positioned during the relatively long active scan segment. Similarly, reference platen 32 is firmly locked while primary platen 30 is advanced during the relatively short inactive segment of the scan.

Figure 5:
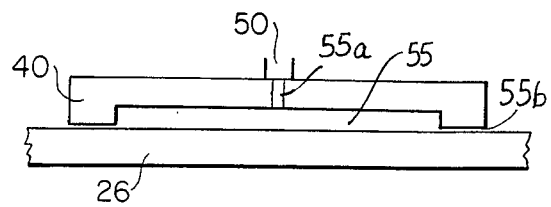
FIG. 5 is a simplified cross-sectional view useful in understanding the operation of air bearings of the type used in the scanning system.

FIG. 5 schematically illustrates in simplified form an air bearing, e.g., bearing 40, which also functions as a brake. The flow of pressurized air through the port enters a cavity 55 via a restrictor 55a which, with a proper pressure differential, provides a constant flow of air through the small air gap 55b and effectively forms a cushion of air to space bearing 40 from the rail 26. Conversely, a vacuum at port 50 will pull the bearing 40 into engagement with rail 26, thus braking and frictionally locking the bearing 40 to the rail.

Relative movement of primary platen 30 and reference platen 32 is obtained by activating pneumatic actuators 56, 58 (FIG. 4), which are mounted to brackets 56a, 58a secured to the horizontal bed 32a of the reference platen. Actuators 56, 58 are thus spaced apart in facing relationship such that their respective pistons 57, 59 are situated to engage bracket 60 extending downwardly from the underside of the primary platen bed. Pistons 57, 59 act against support bracket 60 to move one of the platens relative to the other.

Although two pneumatic actutators for incrementing the platens have been illustrated, other types of actuating devices may be substituted, such as hydraulic pistons or even electrically driven actuators. In addition, there are several options as to the sequence and mode of operation of the actuators. For example, they may be actuated simultaneously by applying pressurized air to one and vacuum to the other, or each may be operated by only pressure or vacuum. The following description discusses one such mode of operation.

Assuming the main platen 30 is stationary, a vacuum will be applied to port 54 to securely lock bearing 44 against rail 26. Primary platen 30 thus is immovably fixed in place. At the same time, air pressure is supplied to ports 50, 52 to release air bearings 40, 42, 46 from engagement with rails 26, 28, thus conditioning the reference platen for movement relative to the primary platen. One or both of the actuators is then activated, causing piston 59 to extend and piston 57 to retract an equivalent amount. If piston 59 is the active element and piston 57 is passive, it will be seen that piston 59 pushes against bracket 60 to advance the reference platen. This incremental advancement is precisely controlled so as to move the reference platen exactly the width of one scanning strip, i.e., 0.256 inches.

The magnitude of the reference platen's incremental advancement is controlled by a servo loop which includes: a photoelectric sensor 62 (FIG. 4) mounted on the reference platen bed 32a, a precision light source located at the position 64 on the underside of the primary platen bed 30a, and the associated elements of the platen control electrical system (FIG. 13), together with the actuators, 56, 58. Any suitable type of position sensor may be used in place of photosensor 62, provided that the requisite degree of precision is obtained.

The positional precision of the incrementing platen movement beneath the shuttle is dependent only on the ability of sensor 62 to provide an unambiguous electrical null signal. When this null signal occurs, the reference platen will have advanced the prescribed increment, whereupon the ports 50,52 are immediately coupled to a vacuum source to frictionally engage bearings 40 and 42 with rail 26. This action locks the reference platen at its new position.

Positioning of the reference platen takes place during the main part of the scan of shuttle 12. It will be recalled, that, in a representative case, this segment of the scan lasts approximately 0.9 seconds. The platen advancing servo loop accordingly has ample time in which to exercise positive control over the reference platen and advance it by the desired precise amount. The system may optionally include an accumulated positional error detection which measures the total accumulated advance of the platen 32 at the end of scanning the entire area. This measurement may be used to correct the platen-advancing control signal so as to shorten or lengthen the incremental distance. In essence, the total positional error is divided by the number of increments, and the result redistributed equally as a correction to each increment.

Once shuttle 12 completes the active portion of the scan, and nears the spring means at the ends of the shuttle guide, primary platen 30 may be released by connecting a source of pressurized air with port 54 to establish a low friction interface between bearings 44, 48, 49. Simultaneously, piston 57 of pneumatic actuator 56 is advanced, while the passive piston 59 of actuator 58 retracts. Piston 57 advances against bracket 60, causing the entire platen 30 to move forward. The characteristic of this incremental advancement is controlled both pneumatically by the pressure feed to actuator 56, and mechanically through physical contact of the end of bearing block 44 against the stop 66 on the reference platen bearing 42. Thus piston 57, pushing upon bracket 60, very quickly brings bearing block 44 into contact with stop 66. This results in a very rapid incremental advance of the primary platen 30 by precisely the same distance travelled by the reference platen. To advance the primary platen, however, it is not required to have precise servo control over its movement, since the stop 66 serves as the positional locator for the primary platen. For this reason, the incrementing of the primary platen can be accomplished precisely within a much shorter time (e.g., 0.1 second).

Coordination of movements between scanner 12 and platens 30 and 32 is brought about through a central processing unit (FIG. 13) controlled by suitable operating software. This coordinated movement is illustrated schematically in FIGS. 6-12.

Figure 6:
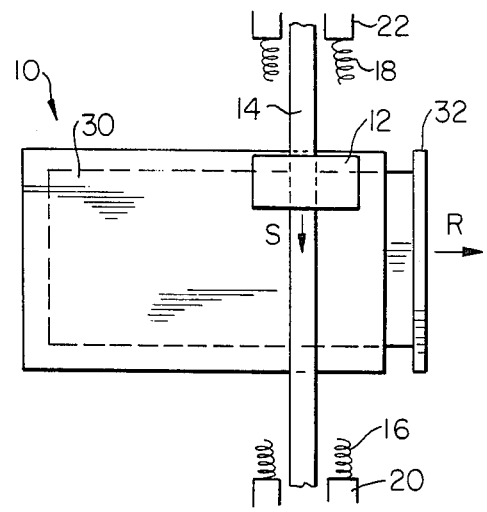
FIGS. 6–12 are simplified plan views showing the sequential stages in the operation of the scanning system.

FIG. 6 illustrates the condition where the shuttle has just rebounded from spring means 18 at the left edge of the scanner, and has commenced its movement in the opposite direction along guide shafts 14, 14a. (For simplicity all elements are shown diagramatically and only guide 14 is illustrated.) This movement of the shuttle is illustrated by the arrow S. Since the shuttle is about to begin the active segment of its scan, platen 30 is securely locked against the rails 26, 28 (not shown). At this point in time, reference platen 32 begins its advancement, as indicated by the arrow R.

Figure 7:
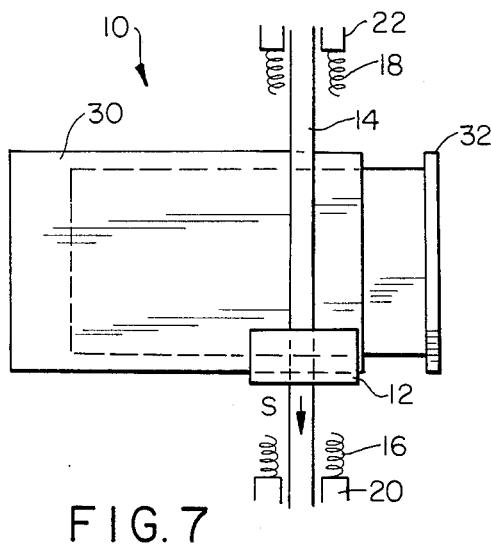

FIG. 7 illustrates the condition at the completion of a scan by shuttle 12, which is now at the right edge of the platen. Approximately 0.9 seconds has elapsed since the beginning of the scan. At this moment in time, both platens are stationary and locked to the rails through the application of vacuum to the air bearings.

Figure 8:
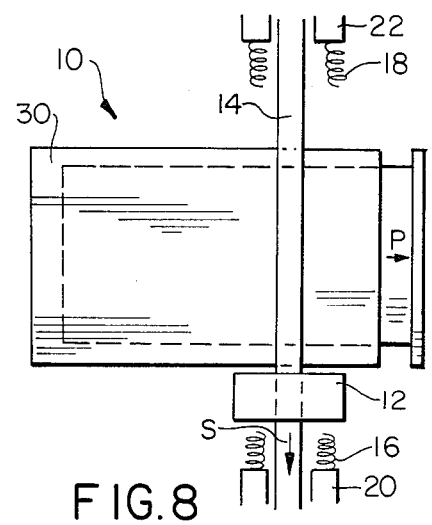

FIG. 8 illustrates the situation a few hundredths of a second later. At this point in time, the vacuum connected to the main platen air bearings is terminated and actuator 56 energized. Platen 30 commences its rapid movement toward its next incremental position, as indicated by arrow P, until it abuts the mechanical stop 66 of the reference platen.

Figure 9:
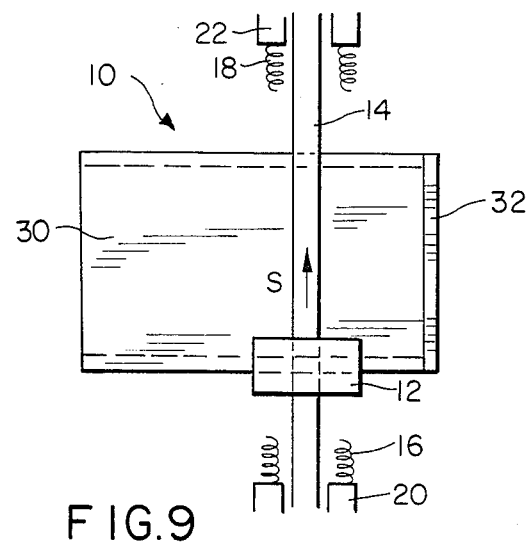
Figure 10:
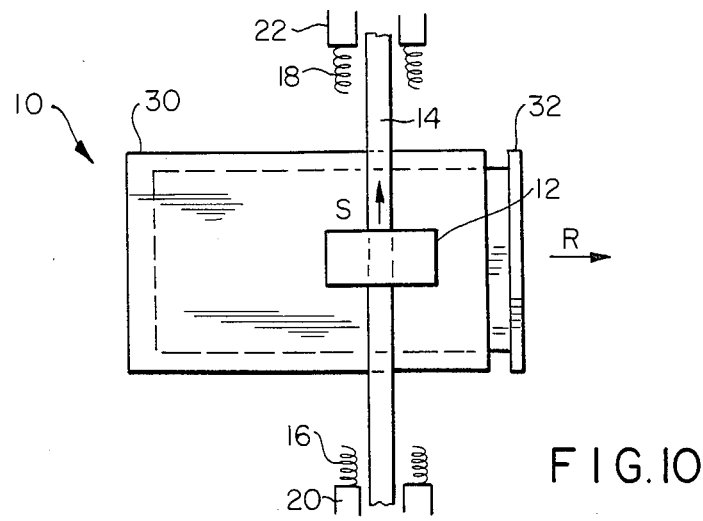

FIG. 9 shows the situation after shuttle 12 has completed its rebound and is progressing toward the left edge of the scanning area. Primary platen 30 is locked into position, whereas air pressure has replaced the vacuum at the reference platen air bearings. Reference platen 32 is now free to advance upon activating pneumatic actuator 58. The reference platen advances as shown by the arrow R in FIG. 10.

Figure 11:
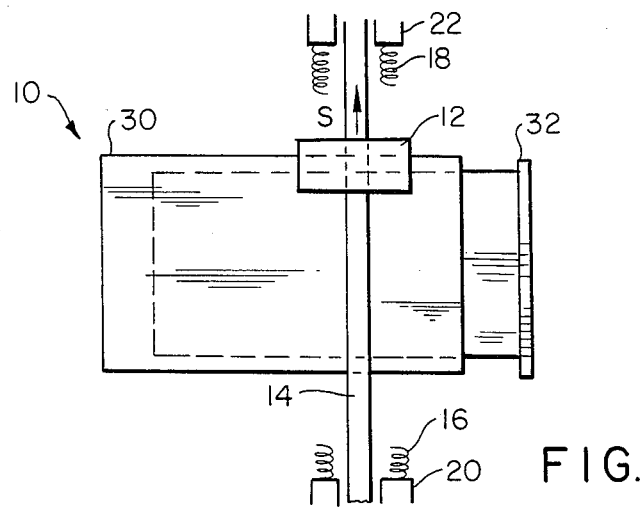

Meanwhile, shuttle 12 continues its traverse toward the left hand support 22. By the time shuttle 12 approaches the end of its scan, as shown in FIG. 11, the reference platen will have incremented precisely the width of one scanning strip (e.g., 0.256 inches). Reference platen 32 is thereupon locked into position so that primary platen 30 can be advanced against the stop by repeating the operation described above. In FIG. 11, the platens are in the stationary position, with shuttle 12 approaching the spring means 18.

Figure 12:
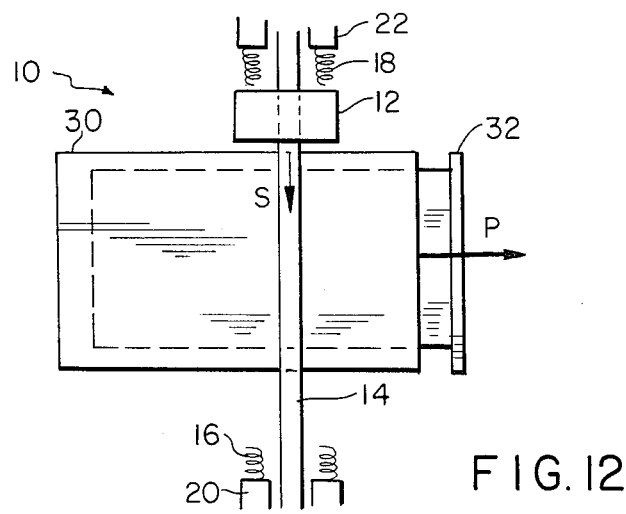

FIG. 12 represents the point during the incrementing sequence where shuttle 12 has just completed its rebound from spring means 18 and is approaching the scanning area to commence its next active scan segment. Before shuttle 12 reaches the left edge of this active scanning area, primary platen 30 will have moved in the direction shown by the arrow P and obtained its new position against the reference platen 32. As already noted, spring means 16, 18 are mounted to supports 20, 22 so as to be completely independent of the platens and shuttle mechanism, thereby thoroughly isolating shocks and vibrations from the operative scanning elements.

The next phase in the operation would be the same as illustrated in FIG. 6 above. This sequence of events is repeated over and over until the entire scanning area has been scanned. In the case of the example discussed, the longitudinal scanning rate amounts to about 0.25 inches/1.0 seconds, or about 15 inches per minute. At that rate a newspaper sheet (or plate) 13 inches wide can be completely scanned in well under one minute.

At the conclusion of the scanning operation over the entire scanning area, the platens may be retracted to their original starting positions. One manner of accomplishing this is to unlock all air bearings and elevate the downstream ends of rails 26, 28 slightly to permit the platens to slide rearward. Other means may also be used to return the platens.

The ability of the apparatus to achieve accurate image presentation is dependent, in part, upon maintaining tight control over the shuttle velocity during the active portions of the scan. Constant velocity over the active scan segment in the present invention is obtained through a continuously acting servo control loop responsive to a velocity transducer. The preferred transducer is a linear doppler velocimeter. It utilizes a laser to measure the speed of the shuttle with extreme precision. The velocimeter is based upon the principle of doppler shift in the frequency of radiation scattered by an object moving relative to a radiating source. The frequency change depends on the velocity of the moving object (a variable) and the scattering geometry (constant). When the frequency scattered from the moving object is compared with the fixed frequency of a crystal oscillator, the frequency difference can be used to develop an electrical control signal. Shuttle velocity is controlled by altering the current fed to the three-phase linear induction motor in response to changes in the velocity control signal.

The velocimeter (not shown) can be mounted in a stationary position at the end of the bridge 36 to continuously monitor shuttle speed. However, as mentioned earlier, an additional shuttle velocity measurement is obtained immediately after the shuttle key rebounded from the spring. To that end, a position detector (not shown) develops an electrical gating (or trigger) signal to obtain a velocity measurement at the correct instant of time. This measurement will thus reflect, in part, the spring losses (which may differ at each spring) and is used to adjust the required motor force. This adjustment is made repetitively once each time the shuttle returns and engages the spring.

Figure 13:
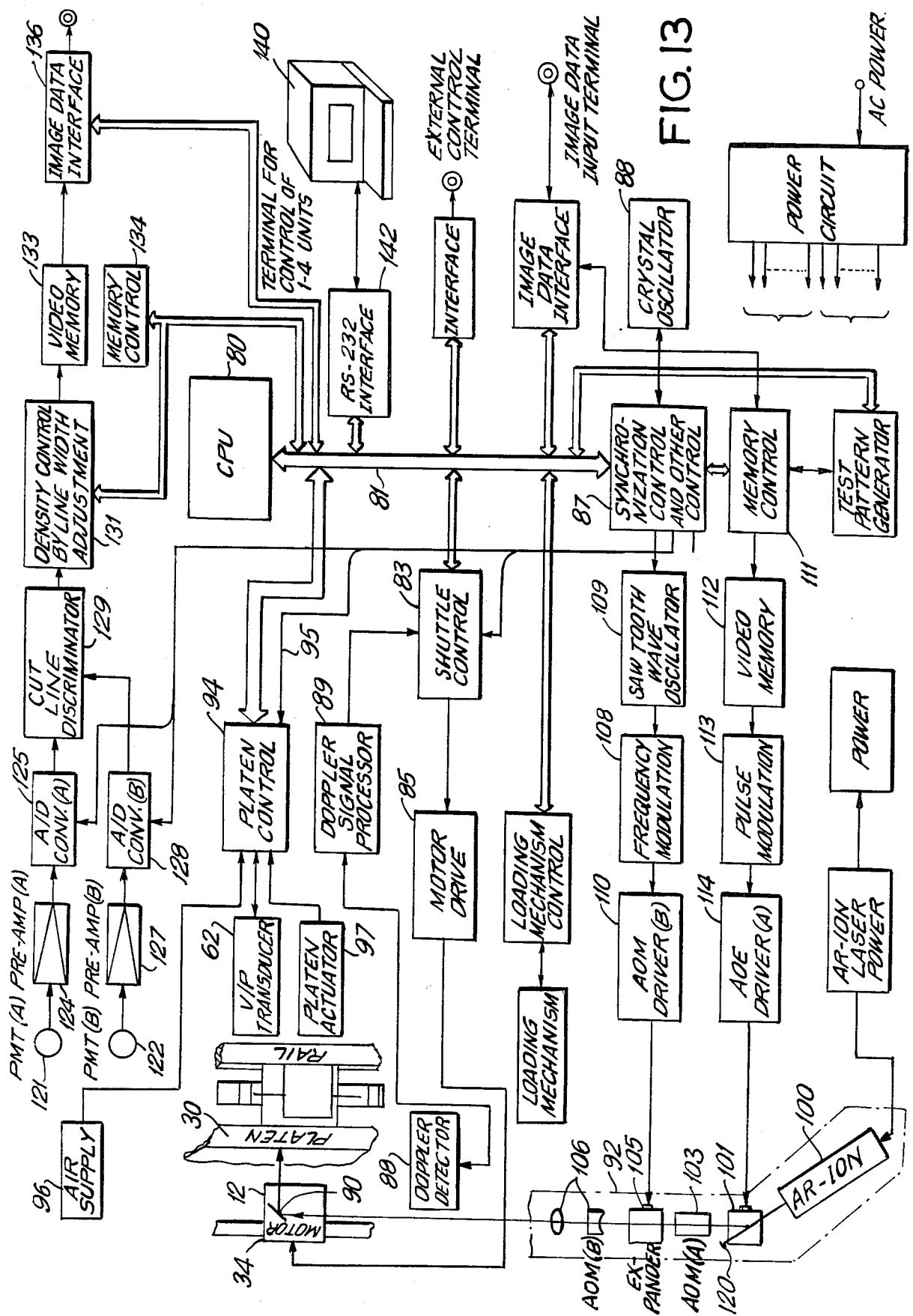
FIG. 13 is an electrical system block diagram of the computerized control and information generating components of the invention.

FIG. 13 shows the primary functional control elements of the system. The heart of the system is the CPU 80, which may be any of a number of known microprocessor elements. This unit is the nerve center of the system and generates all timing and control functions. It communicates with other elements of the system through the CPU I/O data bus 81.

Induction motor 34 is under control of the shuttle control unit 83, which determines the amount of current supplied to the motor 34 via the motor drive power circuit 85. Primary synchronization control is provided by unit 87, which can be programmed by CPU 80 so as to generate the appropriate timing and control signals for selected scanning area sizes, the number of scan lines, scanning speed, etc. It will be appreciated that information written to, or read from, the scanner optics must be synchronized with the shuttle cycle. Shuttle speed is maintained in response to a feedback signal obtained from doppler detector 88. This feedback signal is processed by the doppler signal processor 89 and then compared with the desired speed selected by the CPU in shuttle control unit 83.

It is an important feature of the invention that most of the operative optics can be mounted on the shuttle bridge 36, which is stationary. More particularly, the laser and beam modulator can be mounted in a fixed position; only the final optical elements (e.g., lens and mirror 90 and possibly the deflector 101 noted below) are mounted on the shuttle 12 itself. The laser imaging elements, outlined by the phantom lines, are shown generally by the number 92.

Platen control unit 94 performs a number of functions, previously described. First, in response to an input over conductor 95 from synchronization control unit 87, the platen control ensures that the platens 30, 32 advance at the proper times within each scan traverse. To that end, the platen control 94 supplies pressurized air or vacuum from source 96 to the various air bearing and platen actuators, collectively designated by the actuator unit 97. The positional feedback signal for the primary platen is provided by v/p transducer 62.

Preferably the scanning beam is generated by an argon ion laser 100, which is preferred because of the relatively low power required. The laser beam passes through an acousto-optical deflector 101, an expander 103 and a second acousto-optical deflector 105. From there, the beam is optically formed through conventional glass optics 106, from whence it passes to deflection mirror 90 at the shuttle for directing the beam to the platen surface. The acousto-optical deflectors are devices which, when electrically excited with a given frequency, deflect the laser beam transmitted there through. The amount of beam deflection is dependent upon the excitation frequency. The periodic high frequency sub-scan performed in the system of FIG. 13 is effected by a frequency modulator 108 driven by sawtooth wave oscillator 109. In response to the saw-tooth waveform from unit 109, the deflection exitation signal is swept over a given frequency range. This frequency-modulated signal is power-amplified in driver 110 and then coupled to deflector unit 105.

As the laser beam is being deflected over the course of the sub-scan, it is simultaneously pulsed on and off, depending upon the state of information to be recorded. As shown in FIG. 13, image data received from an input terminal is routed via an image data interface 107 to a memory control 111 which controls the flow of data to and from a video memory 112. In the record mode, digitized information is drawn from video memory unit 112, which may be a random access memory producing a series digital output signal that are either directly or indirectly formed into a series of pulses representing light or dark pixel elements of the image being recorded. These pulses result in pulse modulation of a signal of fixed frequency in unit 113. Such pulses feed the driver 114 for the beam modulating optical deflector 101. This unit operates such that, when no excitation is applied to it, the laser passes through the unit undeflected into an optical stop 120. However, when information is present, a pulse burst appears at unit 101, causing the laser beam to be deflected through the expander 103 and into deflector 105. In short, the pulse bursts effectively turn the beam on and off. It should be appreciated by those skilled in the art that other beam recording or reading approaches are possible. For example, instead of the deflected laser beam, a discrete array of sensors and/or light sources carried by the moving shuttle 12 can be used.

When the unit is functioning as a scanner, or reader, the light reflected from the medium being scanned is detected at photomultipliers 121, 122. Signals from each of these are processed through a respective preamplifier and analog/digital converter 124/125, and 127/128, respectively. Converters 125, 128 encode the scanned information as a digital signal. Two parallel information paths are used initially to discriminate against unwanted cut lines, etc. on the sheet. This function is performed by the cut line discriminator 129. The digital signal may be processed by a suitable density control unit 131, whose output represents the digitized video image. The latter is stored in video memory 133 under control of memory control unit 134 (which functions to control memory address, etc.)

It will be appreciated that video memory 133 preferably is a random access memory (RAM) having sufficient capacity to store the total number of informational "pixels" constituting an entire sheet of material. Of course, any type of RAM memory can be used, such as electronic high density memory or magnetic device storage. Video memory 133 and its associated control 134 are, in purpose, identical to video memory 112 and its memory control 111. Image data interface 136 is used to either receive digitally encoded information for recording, or for transmitting digitally encoded information from memory 133. The system optionally may also include external terminals 140 communicating with the data bus 81 via one or more interfaces 142. Terminal 140 can be used for composition or system programming.

Another feature which may be incorporated into the system is an automatic focusing system for readjusting scanning beam focus as the shuttle is executing its turn-around. This feature is useful for scanning three dimensional objects whose closeness to the shuttle varies over the scanning range. The focusing elements (not shown) can be operated in synchronism with the shuttle under control of timing signals from unit 87. CPU 80, of course, may be programmed to adjust focus in accordance with any desired algorithm as a function of shuttle or platen position. Alternatively, an auto focus system analogous to those used in cameras may be employed.

In summary, the invention provides a system for any of a number of types of media for photocomposition, facsimile reproduction, etc. This system includes a scanning shuttle capable of accurate velocity control and rapid reciprocating motion. It also incorporates a unique arrangement for incrementing the primary platen in such a manner that it is accurately positioned with very little, if any, accumulated error. In addition, the system implements air bearing types of supports which can be used to create an essentially frictionless interface or a friction brake for moving and stopping the platen motion.

Although the invention has been described with reference to specific embodiments, a number of changes and modifications can be made without departing from the spirit and scope of the invention as defined in the appended claims.

I claim:

1. In an apparatus for scanning the surface of a scanning area containing information to be read or in which information is to be recorded and having a scanner controllably movable in a series of transverse scanning movements across the scanning area in proximity thereto:
   a primary platen movable relative to the scanner in a longitudinal direction, said primary platen being adapted to carry therewith a medium to be transversely scanned;
   a reference element incrementally movable longitudinally in the same direction as said primary platen and independently thereof to successive positions corresponding to successive transverse scans traced by the scanner; and
   means for advancing said primary platen into contact with said reference element during one segment of a transverse scan of said scanner.

2. The scanning apparatus of claim 1, wherein:
   said reference element is moved during an active segment of the transverse scan of the scanner while said primary platen is stationary, and said primary platen is moved during an inactive segment of the transverse scan.

3. The scanning apparatus of claim 2, further comprising:
   means for positionally unlocking, advancing and positionally locking said reference element and said primary platen during the active and inactive segments of the transverse scan, respectively.

4. The scanning apparatus of claim 3, wherein:
   said advancing means is carried by one of said primary platen and said reference element, whereby when either said primary platen or said reference element is locked in position, the other may be incrementally advanced by activating said advancing means.

5. The scanning apparatus of claims 1, 2, 3, or 4 further comprising:
   support means including at least one guide for said primary platen and said reference element extending in the direction of longitudinal movement thereof; and
   air bearing means associated with each of said primary platen and said reference element for providing a low friction fluid interface with said support means as said primary platen and said reference element move along said support means.

6. The scanning apparatus of claim 5, further comprising:
   means for controlling the air bearing means associated with at least one of said primary platen and said reference element for selectively causing such air bearing means to frictionally engage said support means to lock said at least one of said primary platen and said reference element in position.

7. Apparatus for scanning a scanning area of a medium on which information is to be recorded or containing information which is to be read, comprising:
   a shuttle guide;
   a transverse scanning shuttle slidably supported on said shuttle guide for reciprocating transverse scanning movement thereon;
   a platen adapted to carry a medium to be scanned and being supported for longitudinal movement, said platen being operative to longitudinally advance the medium relative to the transverse scanning shuttle; and
   a reference element incrementally movable longitudinally in the same direction as said platen to establish a positionable stop defining the limit of longitudinal movement of said platen.

8. Apparatus as set forth in claim 7, further comprising:
   means for controllably advancing the reference element incrementally in the longitudinal direction during one segment of the transverse scan of the scanning shuttle; and
   means for controllably advancing the platen incrementally in the longitudinal direction during another segment of the transverse scan of the scanning shuttle, whereby the reference element is incrementally advanced while the platen is stationary, and the platen is incrementally advanced while the reference element is stationary.

9. Apparatus as in claim 7, further comprising:

means for moving the shuttle back and forth along the shuttle guide at a substantially constant velocity while scanning a scanning area of the medium.

10. Apparatus as in claim 9, wherein said means for moving the shuttle comprises a linear induction motor.

11. Apparatus as in claim 9, wherein said means for moving the shuttle comprises:
spring means located to absorb kinetic energy of said shuttle at each end of travel of said shuttle when it approaches the corresponding limit of its transverse movement and being operative to decelerate and impart a force to said shuttle so as to assist in the reciprocating movement thereof.

12. Apparatus as in claim 11, wherein said spring means includes:
spring reaction means located at each end of travel of said shuttle and supported independently of said shuttle guide and said platen so as to substantially isolate the movable scanning components of said apparatus from shock and vibrations attributable to shuttle reversal forces.

13. Apparatus as set forth in claim 9, further comprising:
velocity measuring means for developing an electrical signal representative of the instantaneous velocity of said shuttle, and means responsive to such signal for controlling a lineal force applied to said shuttle by said moving means so as to maintain the velocity of said shuttle constant.

14. Apparatus as in claim 13, wherein said velocity measuring means comprises a linear laser doppler velocimeter.

15. Apparatus as in claim 8, wherein:
said platen and said reference element are supported for movement by respective air bearings, and the apparatus further comprises:
control means synchronized with the movement of said shuttle for controlling the means for controllably advancing said platen and said reference element; and
means responsive to said synchronized control means for selectively connecting the corresponding ones of said respective air bearings to a source of negative air pressure during periods when either one of said platen and said reference element is to be maintained stationary.

16. Apparatus as in claim 8, wherein:
said means for controllably advancing said platen and said reference element comprise at least one actuator associated with said reference element for reaction against said platen;
whereby said platen and said reference element are moved relative to one another by selective activation of said actuator.

17. Apparatus as in claim 16, wherein said actuator is a fluid cylinder acutuator.

18. Apparatus as in claim 16, wherein said means for controllably advancing said platen and said reference element further comprise:
a position sensor mounted on either said reference element or said platen, said sensor being operative to produce an electrical indication upon the occurrence of a predetermined incremental movement of said reference element relative to said platen while said platen is stationary,
said actuator being responsive to said electrical indication to halt movement of said reference platen upon to occurrence of said predetermined incremental movement.

19. Apparatus as in claim 7, wherein said shuttle includes an air bearing engaging said shuttle guide to establish a low friction interface between said shuttle and said guide.

20. Apparatus as in claim 7, further comprising:
a support, wherein at least one of said platen and said reference element is mounted on said support for longitudinal movement from a starting position toward a finishing position; and
support tilting means for adjusting the horizontal orientation of said support, said support tilting means being operative to selectively tilt said support so as to enable a gravitational return movement of said at least one of said platen and said reference element toward the starting position upon the completion of the scanning of the medium.

21. Apparatus as in claim 7, further comprising:
at least one longitudinally extending platen guide, wherein at least one of said platen and said reference element is mounted for movement along said at least one platen guide; and
means for selectively causing said at least one of said platen and said reference element to either frictionally engage or disengage said at least one platen guide, thereby enabling locking or movement, respectively, of said at least one of said platen and said reference element.

22. Apparatus as in claim 18, wherein:
said means for selectively causing said at least one of said platen and said reference element to either frictionally engage or disengage said at least one platen guide comprises an air bearing associated with each of said at least one of said platen and said reference element and cooperating with said at least one platen guide.

23. Apparatus as in claim 7, wherein said shuttle is operative to scan a band of predetermined width on the medium to be scanned, and wherein said reference element is operative to be advanced an incremental distance corresponding to the width of the band scanned by the shuttle.

24. Apparatus according to claim 23, further comprising:
array scanning means cooperative with said shuttle for simultaneously optically scanning a plurality of information lines contained within said band during each transverse scan of said shuttle.

25. Apparatus according to claim 24, wherein said array scanning means includes sub-scan means for executing a periodic sub-scanning with a scanning beam in the direction of the width of said band.

26. Apparatus for scanning the surface of a record medium, comprising:
an elongated shuttle guide;
a scanning shuttle slidably mounted on the shuttle guide for reciprocating transverse movement thereon;
motor means for imparting linear motion to the shuttle along the shuttle guide;
spring reaction means supported independently of the shuttle guide and located adjacent each of the ends of the shuttle guide;
spring means disposed between said shuttle and each of said spring reaction means such that each of said spring means is resiliently deformed between said shuttle and the corresponding one of said spring reaction means as said shuttle nears the corresponding end of its travel so as to decelerate said shuttle and to absorb shock resulting from a reversal in the direction of travel of said shuttle at the corresponding end of its travel;

a platen adapted to carry a record medium to be scanned and movably mounted for longitudinal movement relative to said shuttle; and means for periodically advancing said platen in synchronism with the reversal in the direction of travel of said shuttle.

27. Apparatus in accordance with claim 26, wherein at least one of the spring means comprises at least one coil spring mounted near the corresponding end of travel of said shuttle.

28. Apparatus as in claim 26, wherein at least one of the spring means comprises a cantilever spring mounted near the corresponding end of travel of said shuttle.

29. Apparatus as set forth in claim 26, wherein at least one of the spring means comprises an air spring mounted near the corresponding end of travel of said shuttle.

30. Apparatus as in claim 26, further comprising:

a reference element mounted for incremental movement by a predetermined distance relative to said platen in the direction of longitudinal movement of said platen, said reference element acting as a positional stop for said platen after said reference element has been moved said predetermined distance; and means for advancing said platen longitudinally against said reference element.

31. Apparatus as in claim 30, further comprising:
means for selectively locking said reference element in a fixed longitudinal position during advancement of said platen.

32. Apparatus as in claim 31, further comprising:
means for selectively locking said platen in position during a transverse scan by said shuttle; and means for advancing said reference element relative to said platen when said platen is locked in a fixed longitudinal position.

33. A method for scanning the surface of a record medium to either read or record information thereon, said method comprising the steps of:

providing a scanner, a platen and a reference element;
mounting a record medium on the platen;
moving the scanner at a substantially constant velocity along a straight line to scan a band of predetermined width across the record medium;
advancing the reference element a distance equal to the width of the band scanned by the scanner, the advance of said reference element taking place during a portion of the transverse scan of the record medium;
reversing the direction of movement of the scanner after the completion of the transverse scan of the record medium; and
advancing said platen into contact with said reference element prior to commencement of a transverse scan of the record medium in the opposite direction.

34. The method of claim 33, further comprising the step of locking said platen in a fixed position while the scanner is scanning the record medium.

35. The method of claim 33, further comprising the step of:
locking the reference element in a fixed position at the completion of its advancement.

36. The method of claim 33 wherein:
said scanner scans a multiplicity of information lines on the record medium during the transverse scan so as to simultaneously generate a plurality of video signals each representing video information in a respective one of the multiplicity of information lines.

37. The method of claim 36, further comprising the steps of:
converting said plurality of video signals into a corresponding plurality of digital signals; and
storing said plurality of digital signals for subsequent readout.

* * * * *